United States Patent [19]
Fukamachi

[11] Patent Number: 5,713,796
[45] Date of Patent: *Feb. 3, 1998

[54] FLYWHEEL ASSEMBLY AND ITS METHOD OF ASSEMBLY

[75] Inventor: Masanobu Fukamachi, Hirakata, Japan

[73] Assignee: Exedy Corporation, Osaka, Japan

[*] Notice: The term of this patent shall not extend beyond the expiration date of Pat. No. 5,569,086.

[21] Appl. No.: 699,215

[22] Filed: Aug. 19, 1996

Related U.S. Application Data

[63] Continuation of Ser. No. 252,452, Jun. 1, 1994, abandoned.

[30] Foreign Application Priority Data

Jun. 4, 1993 [JP] Japan .................. 5-134644

[51] Int. Cl.$^6$ .......................................... F16D 3/80
[52] U.S. Cl. .................. 464/24; 464/64; 464/68
[58] Field of Search .................. 464/62, 64, 65, 464/66, 67, 68, 73, 7; 192/208, 212, 55.9, 70.17; 74/574

[56] References Cited

U.S. PATENT DOCUMENTS

| | | |
|---|---|---|
| 4,274,524 | 6/1981 | Nakane . |
| 4,777,843 | 10/1988 | Bopp . |
| 4,782,718 | 11/1988 | Hartig et al. . |
| 4,890,709 | 1/1990 | Reik et al. . |
| 4,903,544 | 2/1990 | Naudin et al. . |
| 4,996,892 | 3/1991 | Yamamoto .................. 74/574 |
| 5,052,978 | 10/1991 | Hanke . |
| 5,088,964 | 2/1992 | Kuhne . |
| 5,105,680 | 4/1992 | Naudin . |
| 5,105,681 | 4/1992 | Naudin et al. . |
| 5,156,067 | 10/1992 | Umeyama . |
| 5,168,775 | 12/1992 | Naudin et al. . |
| 5,176,233 | 1/1993 | Woerner et al. .................. 74/574 X |
| 5,218,884 | 6/1993 | Röhrle . |
| 5,269,725 | 12/1993 | Maucher et al. .................. 74/574 |
| 5,355,747 | 10/1994 | Kajitani et al. . |

FOREIGN PATENT DOCUMENTS

| | | |
|---|---|---|
| 8219 | 2/1989 | Japan . |
| 5 071 587 | 3/1993 | Japan .................. 74/574 |
| 6 094 080 | 4/1994 | Japan .................. 74/574 |

Primary Examiner—Daniel P. Stodola
Assistant Examiner—William A. Rivera
Attorney, Agent, or Firm—Shinjyu Office of Patent Attorney

[57] ABSTRACT

A flywheel assembly comprising a unitary first flywheel having a hub portion and a radial circumferential portion, the first flywheel connectable to an output shaft, a viscous fluid damping mechanism having a drive member and a driven member, the drive member connected to the first flywheel radial portion, a bearing attached to the driven member and the first flywheel hub portion providing limited rotary displacement therebetween, the bearing, the drive member and the first flywheel defining an annular fluid chamber confining the dampening mechanism, and a second flywheel removably mounted to the driven member.

11 Claims, 11 Drawing Sheets

FLYWHEEL ASSEMBLY AND ITS METHOD OF ASSEMBLY

This application is a file wrapper continuation of application Ser. No. 08/252,452, filed Jun. 1, 1994 (abandoned).

BACKGROUND OF THE INVENTION

The present invention relates generally to a flywheel assembly and its method of assembly, and more particularly, to an assembly and its method of assembly for a flywheel having a pair of flywheels connected to each other so as to be relatively rotatable.

Take for example, the dual flywheel disclosed in Japanese Patent Laid-Open No. 26425/1988 which comprises a first flywheel and a second flywheel which are rotatably mounted to each other so as to be relatively rotatable through a bearing, and a viscous damper mechanism disposed between both the flywheels and elastically connecting both the flywheels to each other in the circumferential direction thereby damping torsional vibration between both the flywheels using the viscous resistance of fluid. The first flywheel is connected to a crankshaft on the engine side, and a clutch disc can abut against a friction surface of the second flywheel. In addition, the bearing is mounted between a radially outer portion of a boss of the first flywheel and a radially inner portion of a boss of the second flywheel. A serration is formed in a radially outer portion of the boss of the second flywheel, and is coupled to an output member of the viscous damper mechanism.

In the dual flywheel of the above construction, the bearing is fitted in the boss of the second flywheel prior to further assembly. Further, when the second flywheel is removed from the first flywheel, the bearing, together with the second flywheel, must be removed.

In the above described dual flywheel, the second flywheel has a friction surface against which the clutch disc is pressed, and whereby requires, depending on the wear and the damage of the friction surface, the second flywheel to replaced. In the above described conventional construction, whenever the second flywheel is mounted on and or removed from the first flywheel, the bearing fitted in the second flywheel is also mounted and removed. Since a large load is applied in mounting and removing the bearing, the life of the bearing is shortened with every replacement of the second flywheel.

SUMMARY OF THE INVENTION

An object of the present invention is to make it possible to mount and remove a second flywheel on and from a first flywheel easily and without adversely affecting other components.

A flywheel assembly according to the present invention comprises a first flywheel, a bearing, a viscous damper mechanism, and a second flywheel. The bearing is mounted on the first flywheel. The viscous damper mechanism comprises a driven member, a coil spring, and a viscous damper part. The driven member is rotatably supported on the first flywheel through the bearing. The second flywheel is removably mounted on the driven member, and a clutch disc is connectable to the second flywheel.

The flywheel assembly is assembled by rotatably mounting the driven member on a boss of the first flywheel through the bearing and removably fixing the second flywheel to the driven member.

Since the second flywheel is removably mounted on the driven member which is rotatably supported on the first flywheel through the bearing, the second flywheel can be mounted and removed independent of the bearing. Consequently, the second flywheel can be easily replaced, thereby preventing excessive wear on the bearing and thus maintaining its lifespan.

The foregoing and other objects, aspects and advantages of the present invention will become more apparent from the following detailed description.

DESCRIPTION OF THE PREFERRED EMBODIMENTS

Figure 1:
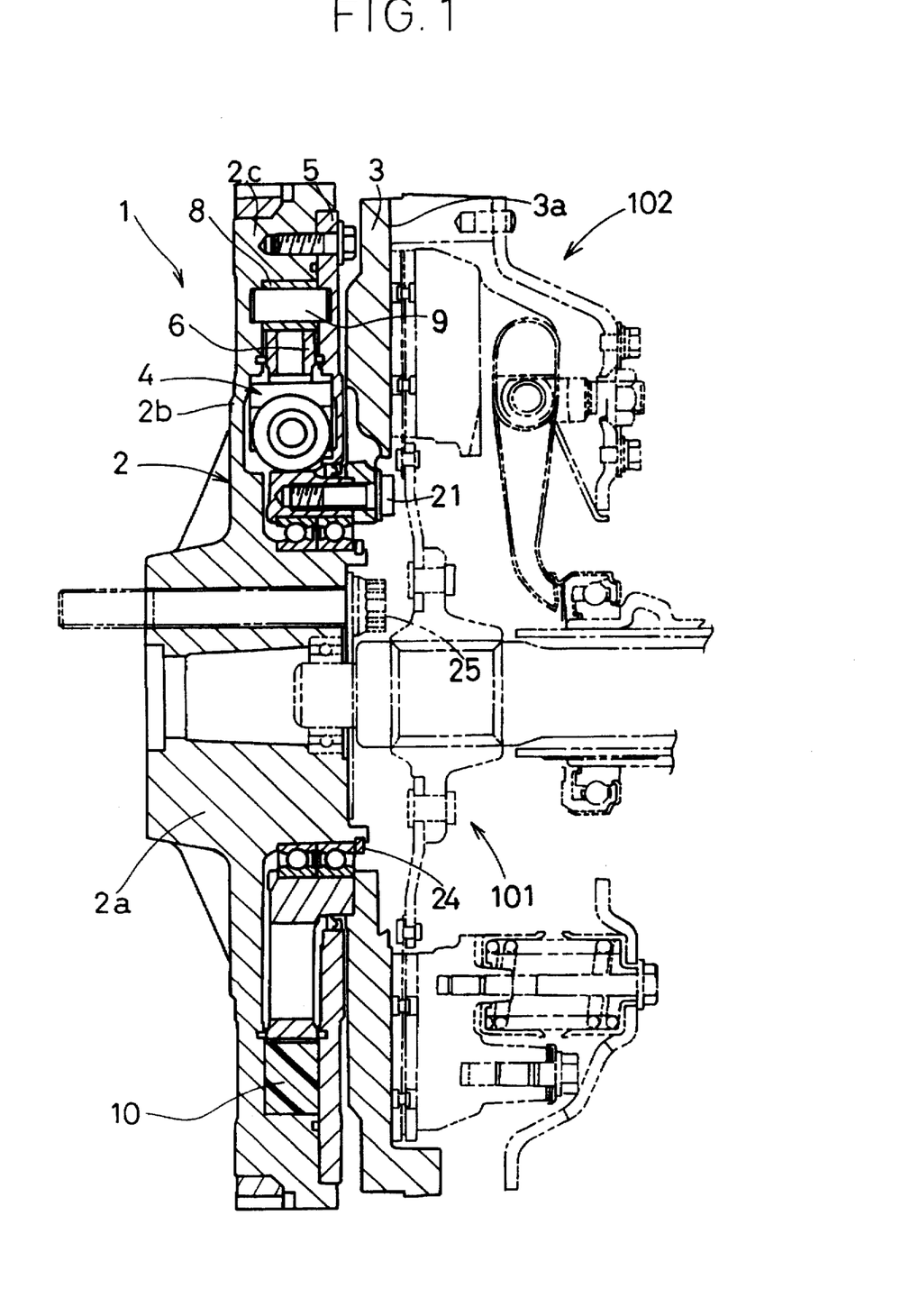
FIG. 1 is a schematic cross sectional view showing a power transmission apparatus employing one embodiment of the present invention.

FIG. 1 shows a power transmission apparatus employing one embodiment of the present invention. The left side is the front side (engine side) and the right side is the rear side (transmission side).

The power transmission apparatus is mainly composed of a flywheel assembly 1, a clutch disc 101, and a clutch cover assembly 102.

As shown in FIGS. 1 to 4, the flywheel assembly 1 mainly comprises a first flywheel 2, a second flywheel 3, and a viscous damper mechanism 4 disposed between the first flywheel 2 and the second flywheel 3. The first flywheel 2 is fixed to an end of an engine crankshaft by a bolt 25. The second flywheel 3 has a friction surface 3a against which a friction member of the clutch disc 101 is pressed on its rear side surface. In addition, a clutch cover of the clutch cover assembly 102 is fixed to a radially outer portion of the friction surface 3a.

Figure 2:
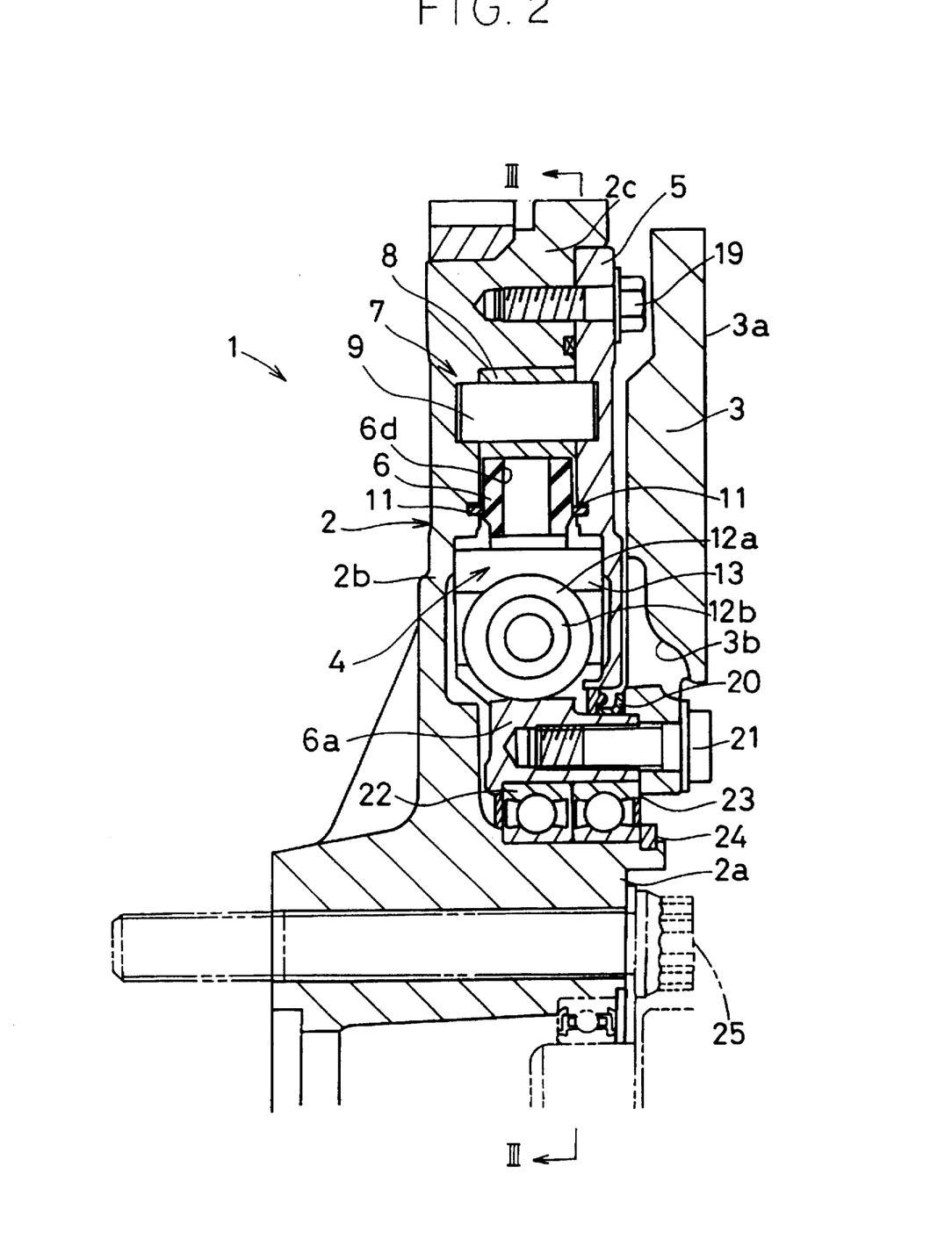
FIG. 2 is a partially enlarged view showing the upper half of FIG. 1.

The first flywheel 2 is a substantially disc-shaped member, and has a hub portion 2a, a disc portion 2b extending outward from the hub portion 2a and formed integrally therewith, and a rim 2c extending backward from a radially outer portion of the disc portion 2b. An annular recess is formed between the hub portion 2a and the rim 2c, and the viscous damper mechanism 4 is contained in the recess. Two rolling bearings 22 and 23 are mounted side-by-side on a radially outer portion of the hub portion 2a.

Each of the bearings 22 and 23 is one of a lubricant sealing type having sealing members mounted on both its sides. A snap ring 24 is fitted in a radially outer surface of the hub portion 2a to regulate backward movement of the bearings.

The second flywheel 3 is a substantially disc-shaped member, and its radially inner portion is removably fixed to a driven member 6 (as described later) of the viscous damper mechanism 4 by a bolt 21. In addition, a radially inner end of the second flywheel 3 regulates the backward movement of the rolling bearings 22 and 23. Further, a hole 3b is formed in the radially inner portion of the second flywheel 3 allowing the clutch disc 101 and the viscous damper mechanism 4 to communicate with each other. As can be seen in FIG. 2, each of the bearings 22 and 23 includes an inner race and an outer race, such as the inner race 23a and the outer race 23b of the bearing 23. The outer race 23b has an axial face 23c which contacts the second flywheel 3. It should be appreciated that the second flywheel 3 is not pressed onto the bearing 23, but only contacts the axial face 23c of the outer race 23b of the bearing 23. The second flywheel 3 is also formed with an annular ridge 3c, which engages the boss 6a, and centers the second flywheel 3 on the driven member 6.

Figure 3:
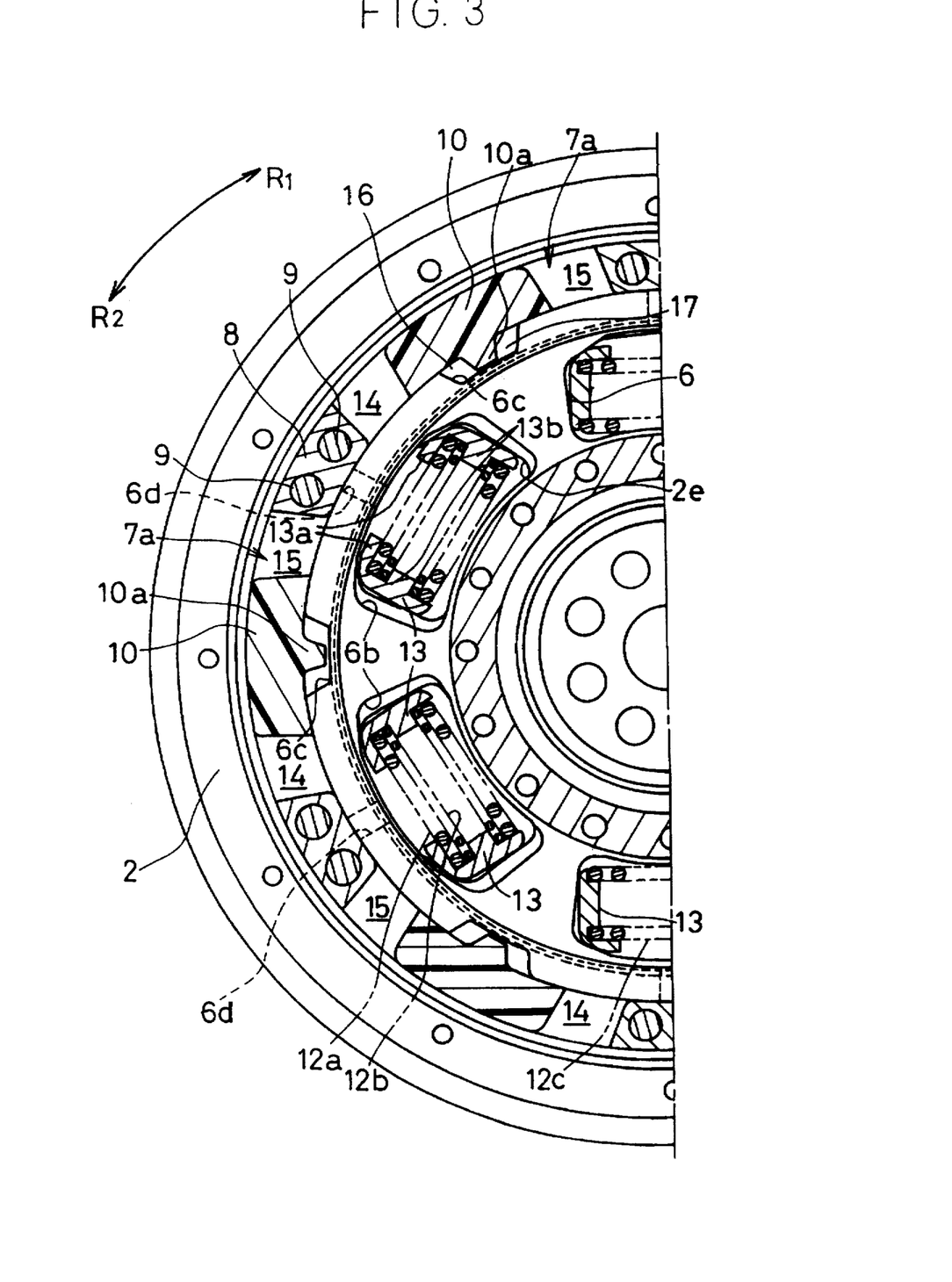
FIG. 3 is a partially sectional view taken along a line III—III shown in FIG. 2.

The viscous damper mechanism 4, shown in FIG. 2, is mainly composed of a disc-shaped drive plate 5 fixed to the first flywheel 2, a disc-shaped driven member 6 having its radially inner portion supported on the first flywheel 2 through the rolling bearings 22 and 23, coil springs 12a, 12b and 12c for elastically connecting an input member comprising the first flywheel 2 and the drive plate 5 and the driven member 6 to each other in the circumferential direction, the above members being shown in FIG. 2 and 3. The viscous damper mechanism 4 further includes a viscous damper part 7 for damping torsional vibration by viscosity of fluid, as indicated in FIG. 2 and described in greater detail below. The viscous damper mechanism 4, has an annular chamber 7a formed by the first flywheel 2, the drive plate 5, and a driven boss 6a of the driven member 6 is filled with viscous fluid. A radially outer end of the drive plate 5 is fixed to the rim 2c of the first flywheel 2 by a plurality of bolts 19. An annular sealing member 20 is disposed between a radially inner end of the drive plate 5 and the driven boss 6a of the driven member 6. The sealing member 20 and the above described sealing members of the bearings 22 and 23 seal a radially inner end of the above described annular chamber 7a.

Since the drive plate 5 is mounted on the first flywheel 2 by the bolts, the viscous damper mechanism 4 can be replaced by removing the drive plate 5. Consequently, the viscous damper mechanism 4 can be overhauled, thereby making it possible to cope with a large-sized vehicle.

The driven member 6 is a casting member formed in a disc shape, and is disposed between the disc portion 2b of the first flywheel 2 and the drive plate 5. The driven member 6 has the driven boss 6a flanged backward from its radially inner portion, as described above. The rolling bearings 22 and 23 are mounted on a radially inner portion of the driven boss 6a, and the radially inner portion of the second flywheel 3 is fixed to the driven boss 6a by the bolt 21. Six window holes 6b are formed circumferentially equidistant in a radially intermediate portion of the driven member 6. The window holes 6b extend in the direction of rotation, and coil springs 12a, 12b and 12c are contained in the window holes 6b.

As shown in FIG. 3, the coil springs 12c are respectively contained in the radially opposing two window holes 6b (the window holes in the vertical direction of FIG. 3) out of the six window holes 6b of the driven member 6. The coil spring 12c abuts against end surfaces in the circumferential direction of the window hole 6b through spring sheets 13. The large-diameter coil spring 12a and the small-diameter coil spring 12b disposed therein are contained in each of the remaining four window holes 6b. Although spring sheets 13 are disposed in both ends of the coil springs 12a and 12b, predetermined clearances are respectively ensured between the spring sheets 13 and the end surfaces in the circumferential direction of the window hole 6b in a torsion free state. The spring sheet 13 has a radially outer supporting part 13a and a boss 13b. The large diameter coil spring 12a has its radially outer portion supported on the radially outer supporting parts 13a of the spring sheets 13, and the small diameter coil spring 12b has its radially inner portion supported on the bosses 13b of the spring sheets 13. The coil springs 12a and 12b are prevented from interfering with each other because they are coaxially disposed by the spring sheets 13.

The first flywheel 2 and the drive plate 5 respectively have abutting parts which abut against ends of each of the spring sheets 13, whereby the input member comprising the first flywheel 2 and the drive plate 5 and the driven member 6 are elastically connected to each other in the direction of rotation. In FIG. 3, an abutting part 2e of the first flywheel 2 is illustrated.

The viscous damper part 7 is mainly composed of an annular fluid chamber 7a, and a stopper member 8 and a slide stopper 10 formed of an elastic resin material, which are disposed in the annular fluid chamber 7a.

The annular fluid chamber 7a, defined above, is further constructed to be enclosed by a radially inner surface of the rim 2c of the first flywheel 2, a radially outer surface of the driven member 6, and the disc portion 2b of the first flywheel 2 and the drive plate 5. It is filled with viscous fluid. Six stopper member 8 are disposed circumferentially equidistant in the annular fluid chamber 7a, and divide the annular fluid chamber 7a into six division chambers. The stopper member 8 is connected to the first flywheel 2 and the drive plate 5 by pins 9 so as not to be relatively rotatable. A choke $C_2$ through which viscous fluid can pass between the division chambers is formed between a radially inner surface of the stopper member 8 and the radially outer surface of the driven member 6. Recesses 6c are formed between the window holes 6b on a radially outer edge of the driven member 6; each recess is concave and all are circumferentially equidistant from each other. A liquid supplying hole 6d extending radially outward from the center of the window hole 6b and opening to the annular fluid chamber 7a is formed in the middle between the adjacent recesses 6c. This hole 6d is positioned in the center of the stopper member 8 in a torsion free state.

The slide stopper 10 is formed of resin, and is disposed between adjacent stopper members 8. Within the chamber the stopper members 8 and the slide stoppers 10 further define first arcuate chambers 14 and a second arcuate chambers 15. The slide stopper 10 has its radially outer surface formed in a circular arc shape along the radially outer surface of the rim 2c and has its radially inner surface formed in a circular arc shape along the radially outer surface of the driven member 6. The slide stopper 10 has a projection 10a projected radially inward from its center. The projection 10a is disposed in the recess 6c of the driven member 6 and divides it into a first sub-chamber 16 and a second sub-chamber 17. Further, a choke $C_1$ through which viscous fluid can pass between the first sub-chamber 16 and the second sub-chamber 17 is formed between a radially inner end of the projection 10a and the bottom surface of the recess 6c. The choke $C_1$ is so formed as to have a larger flow passage cross-sectional area than that of the choke $C_2$. In addition, the adjacent end surfaces of the recess 6c and the projection 10a of the slide stopper 10 which abut one another are complimentarily inclined. When the end surfaces of the stopper 10 and the recess 6c abut, the choke $C_1$ closes restricting fluid flow. If the above mentioned inclined surfaces are further pressed against one another, after engagement with the end surface of the recess 6c, during relative motion of the flywheels 2 and 3, a component of force for moving the slide stopper 10 radially outward is produced.

Figure 5:
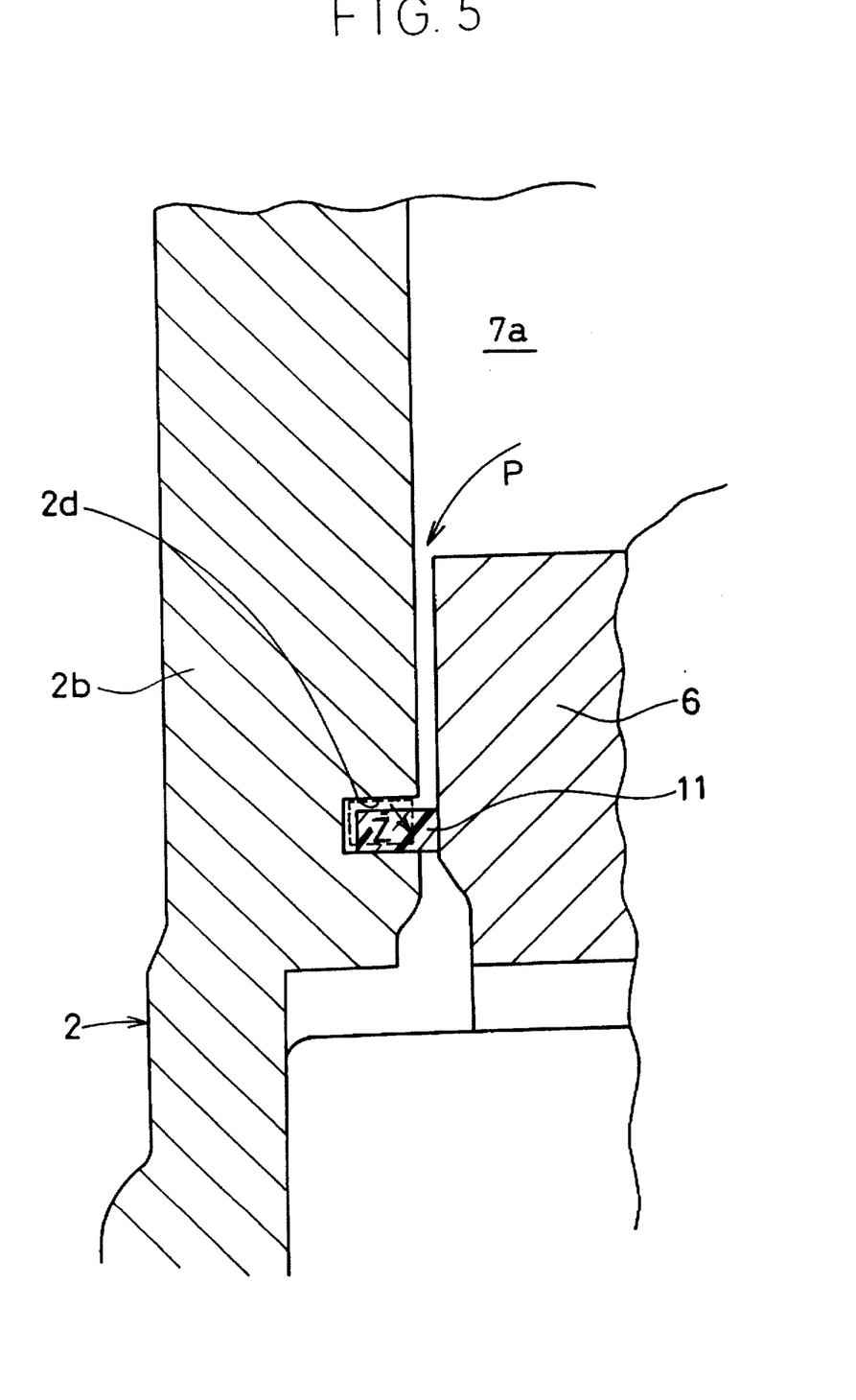
FIG. 5 is a partially enlarged view of FIG. 2.

A radially inner portion of the annular fluid chamber 7a is sealed by annular sealing members 11 formed of Teflon or heat-resistant and wear-resistant resin. The sealing members 11 are respectively disposed between the first flywheel 2 and the driven member 6 and between the drive plate 5 and the driven member 6. As shown in detail in FIG. 5, one of the sealing members 11 is movably disposed between an annular groove 2d formed in the first flywheel 2 and an end surface of the driven member 6. Although the sealing member 11 is disposed in the annular groove 2d, as indicated by a dotted line in FIG. 5, when no pressure is applied to the annular fluid chamber 7a, the sealing member 11 is moved to a position indicated by a solid line in FIG. 5, and when pressure P is applied, the radially inner portion of the annular fluid chamber 7a becomes sealed the movement of the seal indicated in FIG. 5 by the arrow Z depicted within the seal 11. A similar annular groove is also formed in the drive plate 5, and the other sealing member 11 is disposed inside.

The benefit of the above described construction is that it is not necessary to have radial projections extending from the driven member 6, thus radial outer surface can be processed of the driven member 6 can be processed and the choke $C_2$ may be formed easily and precisely by lathe. Manufacturing costs are thus reduced, and since the slide stoppers 10 are formed separately, the formations of projections are made easy.

Description is now made of operations of the flywheel assembly according to the above described embodiment.

When torque is input to the first flywheel 2 from the crankshaft on the engine side, the torque is subsequently transmitted to the second flywheel 3 through the driven member 6, the coil springs 12a, 12b and 12c, as well as the viscous damper mechanism 4. At this time, if torsional vibration is inputted from the engine, the coil springs 12a, 12b and 12c repeatedly expand and contract, and the viscous damping part 7 produces a viscous resistance force to damp torsional vibration.

Figure 4:
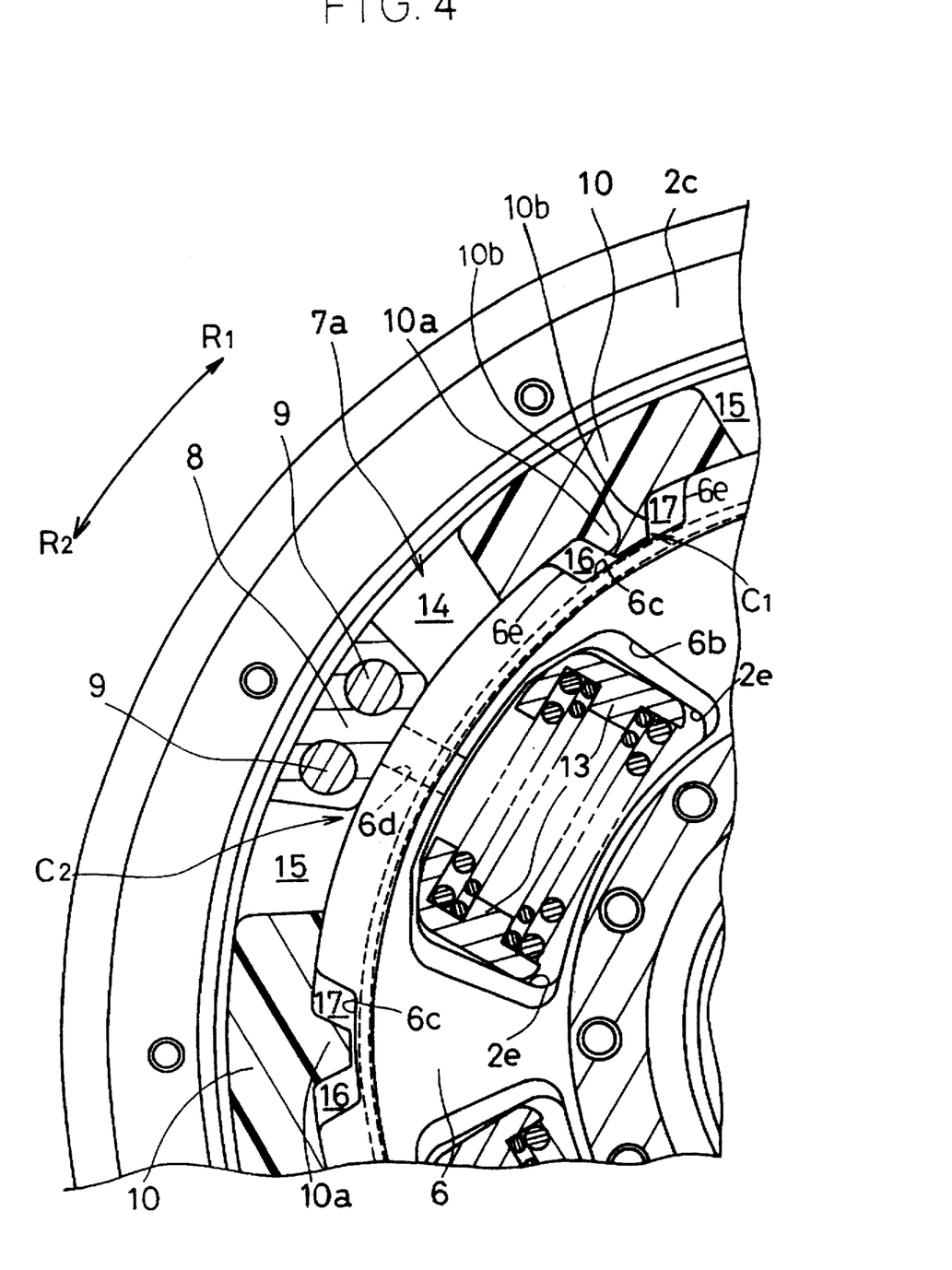
FIG. 4 is a partially enlarged view showing the upper half of FIG. 3.

With reference to FIG. 4, description is now made of operations at the time of relative rotation between the first flywheel 2 and the second flywheel 3.

When torque is input to the first flywheel 2 from the crankshaft on the engine side, the first flywheel 2 and the drive plate 5 are rotated relative to the driven member 6. The first flywheel 2 and the drive plate 5 then rotate in the direction of rotation $R_1$ away from their position in a torsion free state shown in FIG. 4. When the drive plate 5 rotates in the direction of rotation $R_1$ relative to the driven member 6, the slide stopper 10 is similarly moved in the direction of rotation $R_1$. Consequently, the volume of the second sub-chamber 17 is decreased and at the same time, the volume of the first sub-chamber 16 is increased. Specifically, fluid in the second sub-chamber 17 flows to the first sub-chamber 16 through the choke $C_1$ as the slide stopper 10 is moved. Since the flow passage cross-sectional area of the choke $C_1$ is large, the viscous resistance thereof is small. In addition, only the coil spring 12c is compressed in a range of small torsional angle, while the coil springs 12a and 12b are not compressed until the spring sheet 13 abuts against the window hole 6b of the driven member 6. Consequently, low rigidity and small viscosity are exerted up to the point where the spring seat 13 abuts against the window hole 6b (i.e. a small torsional displacement angle).

Figure 6:
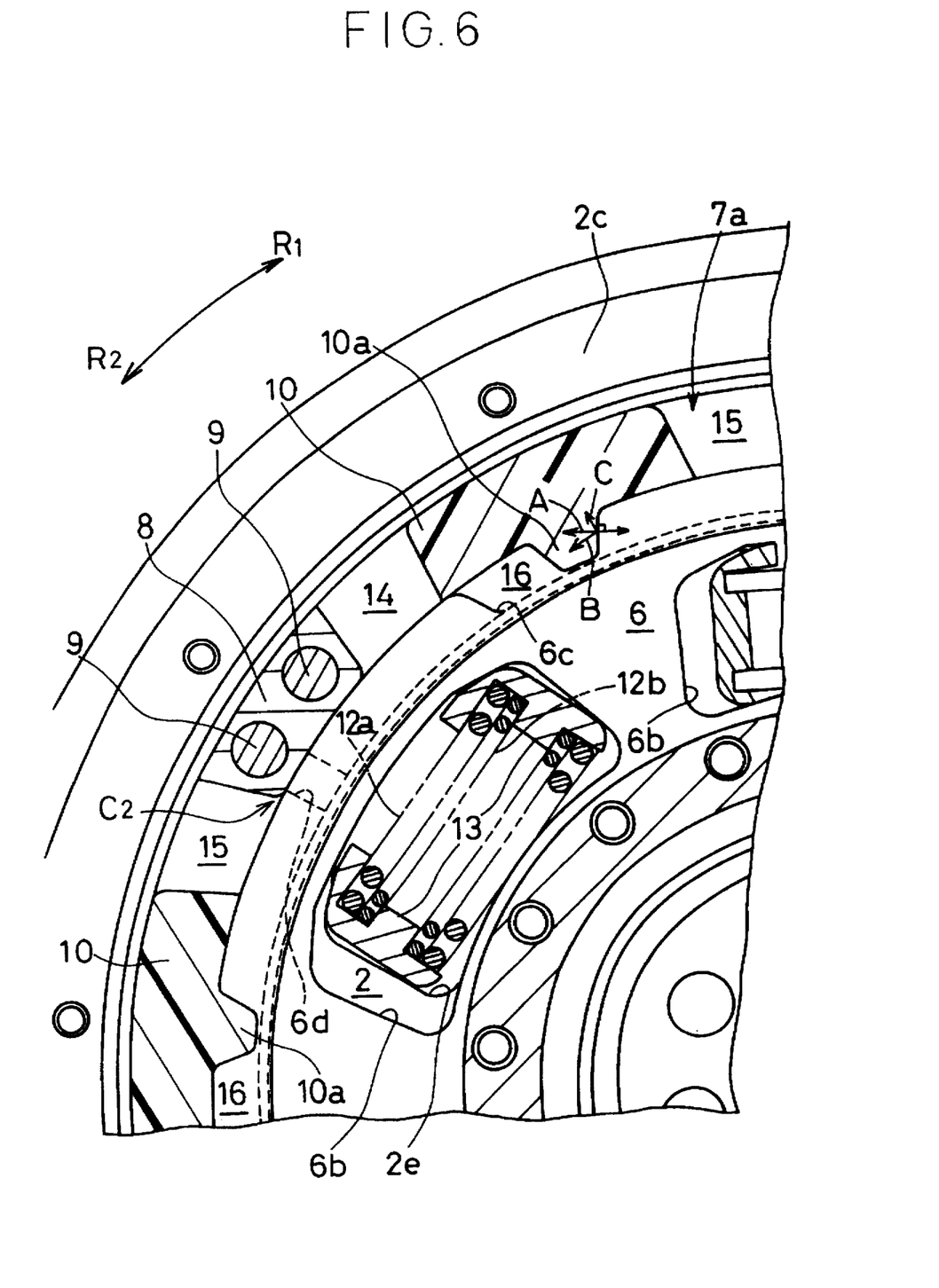
FIG. 6 is a view similar to FIG. 4, showing relative displacement of various elements of the present invention.

If the torsional displacement angle in the direction of rotation $R_1$ is increased, the projection 10a of the slide stopper 10 abuts against the end surface of the recess 6c of the driven member 6 (see FIG. 6). Consequently, the choke $C_1$ is closed and then the choke $C_2$ functions. The projection 10a is pressed against the end surface of the recess 6c, a force A perpendicular to both abutting inclined surfaces is produced. The force A can be separated into a circumferential component of force B and a radial component of force C. The component of force C and a centrifugal force cause the slide stopper 10 to be pressed radially outward, whereby the radially outer surface of the slide stopper 10 is pressed against the radially inner surface of the rim 2c, and thus eliminating any a clearance therebetween. If the first flywheel 2 continues to rotate relative to the slide stopper 10, where the stopper 10 is fixed to the driven member 6, a large resistance force is produced therebetween due to dry friction. The resistance force can be adjusted by manipulation of the complimentary angles of the abutting inclined surfaces of the projections 10a and the recess 6c.

Figure 7:
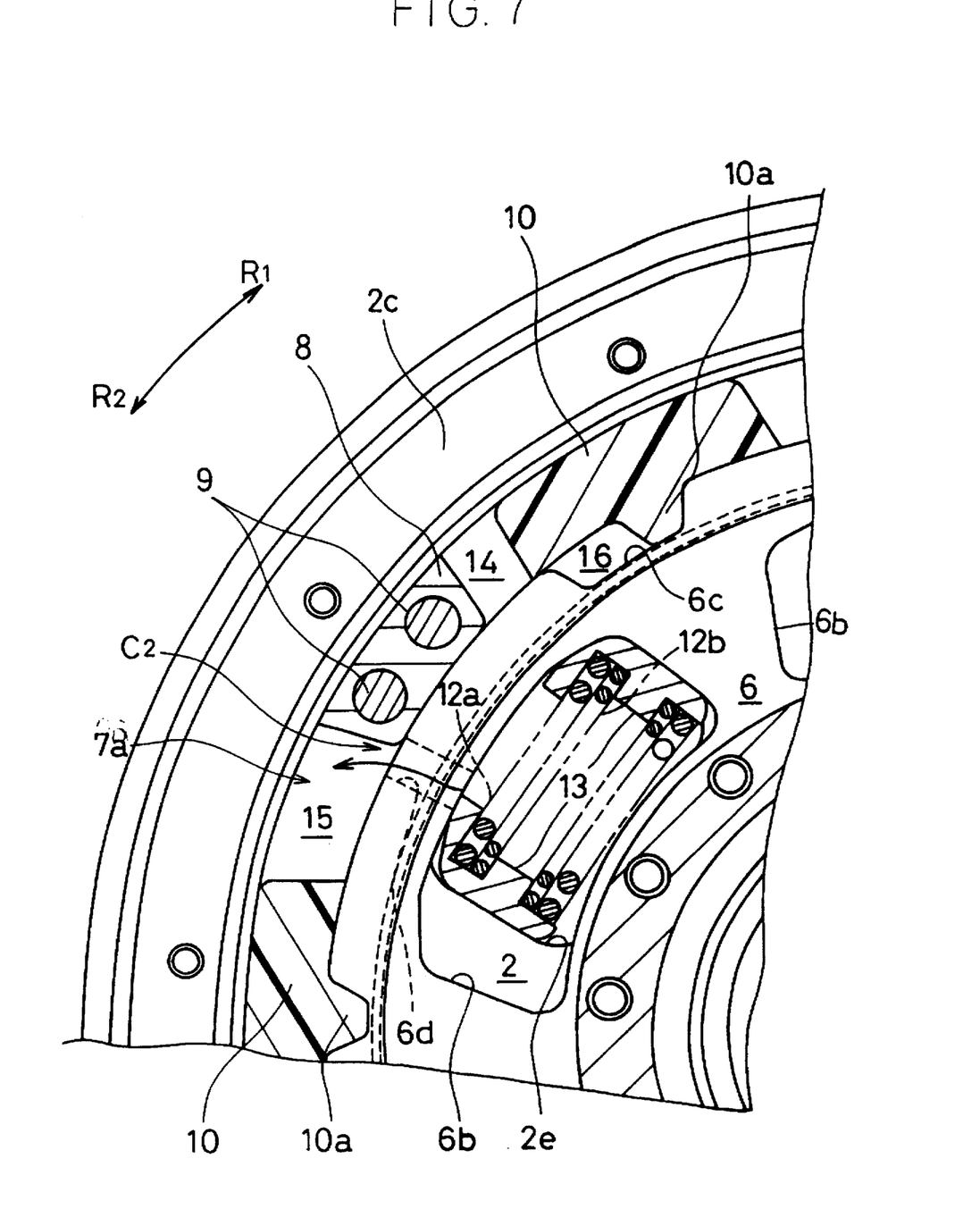
FIG. 7 is a view similar to FIGS. 4 and 6 showing further relative displacement of various elements of the present invention.

If the torsional angle shown in FIG. 6 is further increased to that shown in FIG. 7, the coil springs 12a and 12b start to be compressed. In the angular displacement range where springs 12a and 12b are compressed, high rigidity characteristics or responses are obtained. At the same time, fluid in the first arcuate chamber 14 flows into the second arcuate chamber 15 through the choke $C_2$. Since the flow passage cross-sectional area of the choke $C_2$ is small, large viscous resistance is experienced. The above described dry frictional resistance is added to the viscous resistance, thereby obtaining a large resistance force.

Furthermore, the stopper member 8 is moved in the direction of rotation $R_1$ at this time, whereby the liquid supplying hole 6d of the driven member 6 opens to the second arcuate chamber 15. Therefore fluid, accumulated in the window hole 6b of the driven member 6, quickly flows into the second arcuate chamber 15 by the centrifugal force and an increased attraction force from the second arcuate chamber 15. Since the inside of the window hole 6b is a place where the largest amount of viscous fluid is accumulated in the radially inner portion of the annular fluid chamber 7a, a sufficient amount of fluid can be returned to the annular fluid chamber 7a, thereby making it difficult to cause the shortage of fluid in the annular fluid chamber 7a.

Figure 8:
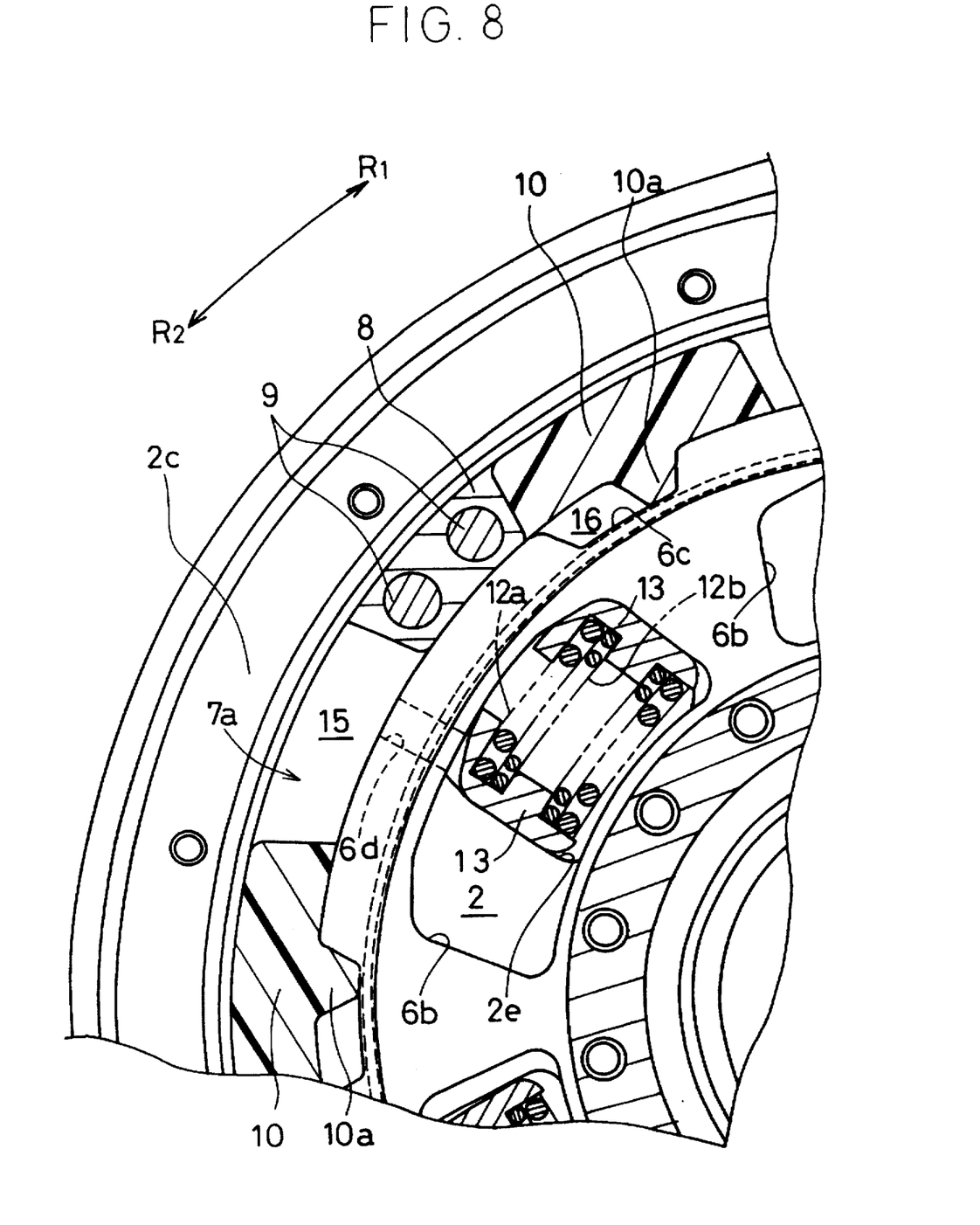
FIG. 8 is a view similar to FIGS. 4, 6 and 7 showing still further relative displacement of various elements of the present invention.

If the torsional angle shown in FIG. 7 is increased to that shown in FIG. 8, the stopper member 8 abuts against the slide stopper 10. Consequently, the relative rotation between the first flywheel 2 and the drive plate 5 and the driven member 6 is constrained.

Figure 9:
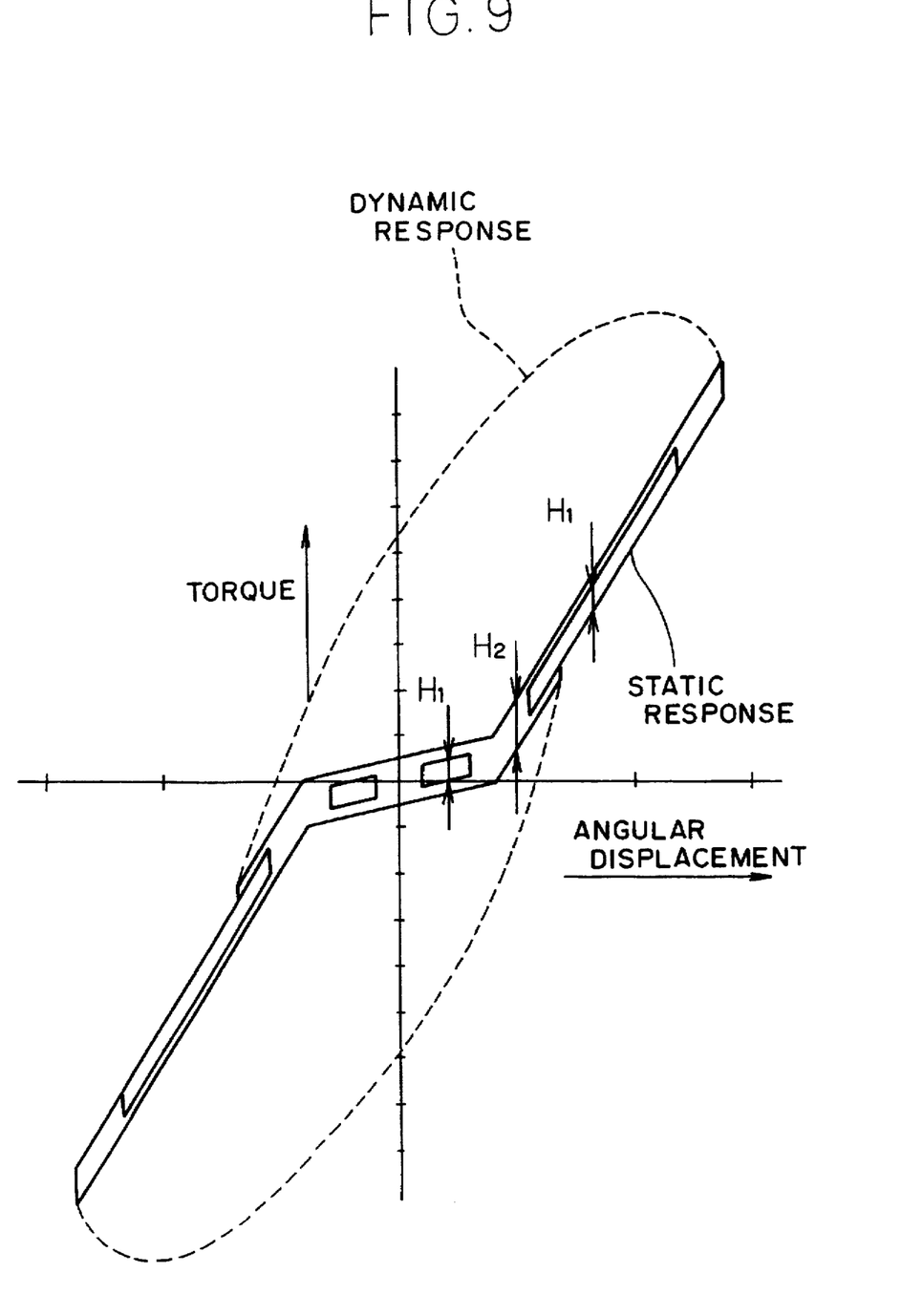
FIG. 9 is a graph showing the torsional characteristics of a flywheel assembly in response to relative displacement of the elements of the present invention.

FIG. 9 is a diagram showing torsional characteristics of the flywheel assembly 1, where a solid line indicates static torsional characteristics, and a dotted line indicates dynamic torsional characteristics. In the static torsional characteristics, a region of small hysteresis torque $H_1$ which can be seen in a range of small torsional angle is an angle range in which the slide stopper 10 is rotated relative to the driven member 6 so that the choke $C_1$ functions. Large hysteresis torque $H_2$ is produced by the choke $C_2$. The reason why the small hysteresis torque $H_1$ in a range of large torsional angle is seen is that when small torsional vibration (for example, combustion fluctuation) is caused in a state where the drive plate 5 is rotated through a predetermined angle relative to the driven member 6, the slide stopper 10 is separated from the end in the circumferential direction of the recess 6c of the driven member 6 so that the choke $C_1$ functions. Since the small hysteresis torque $H_1$ can be thus produced irrespective of the relative angle of the drive plate 5 with the driven member 6, it is possible to effectively damp slight vibration at the time of, for example, combustion fluctuation.

In the dynamic torsional characteristics shown in FIG. 9, viscosity becomes significantly larger than the conventional one. The reasons for this are mainly as follows:

Since a sufficient amount of fluid is returned to the annular fluid chamber 7a from the window hole 6a of the driven member 6, it is difficult to cause the shortage of viscous fluid.

Since the sealing member 11 seals the annular fluid chamber 7a and the driven member 6 is integrally formed, little fluid leaks.

A dry frictional force produced by pressing the radially outer surface of the slide stopper 10 against the radially inner surface of the rim 2c is added to the viscosity.

Since a large viscous damping force is exerted on such a large torsional angle, back-and-forth vibration of the body of an automobile at the time of tip-in and tip-out and vibration thereof at the time of starting the engine are restrained.

Description will now made of method of assembly of the above described flywheel assembly 1.

First, the rolling bearings 22 and 23 are forced into the radially inner portion of the driven boss 6a of the driven member 6. The driven member 6 with the bearings 22 and 23 mounted thereon is mounted on the first flywheel 2. At this time, the bearings 22 and 23 are forced into the radially outer portion of the hub portion 2a of the first flywheel 2. The sealing member 11 is previously inserted into the annular groove 2d of the first flywheel 2. After the driven member 6 is mounted on the first flywheel 2, the snap ring 24 is mounted on the hub portion 2a. Further, the spring sheet 13 and the coil springs 12a, 12b and 12c are mounted on the driven member 6. The stopper members 8 are mounted in the annular fluid chamber 7a with the pins 9, and the slide stopper 10 is further inserted into the annular fluid chamber 7a. In this state, fluid (for example, grease) is put in a portion corresponding to the fluid chamber 7a. The drive plate 5, an annular groove of which the sealing member 11 is inserted, is fixed to the rim 2c of the first flywheel 2 by the bolts 19. Subsequently, the sealing member 20 is inserted between the radially inner portion of the drive plate 5 and the radially outer portion of the driven boss 6a.

After the viscous damper mechanism 4 is assembled in the above described manner, the second flywheel 3 is fixed to the driven boss 6a of the driven member 6 using bolts 21.

In such an assembling method, the second flywheel 3 can be easily mounted and removed by removing or tightening the bolt 21. Moreover, in mounting and removing the second flywheel 3, the bearings 22 and 23 and the sealing member 20 need not be touched, thereby decreasing wear on the bearings 22 and 23 and the sealing member 20; thus lengthening their usable lifespan.

OTHER EMBODIMENT

Figure 10:
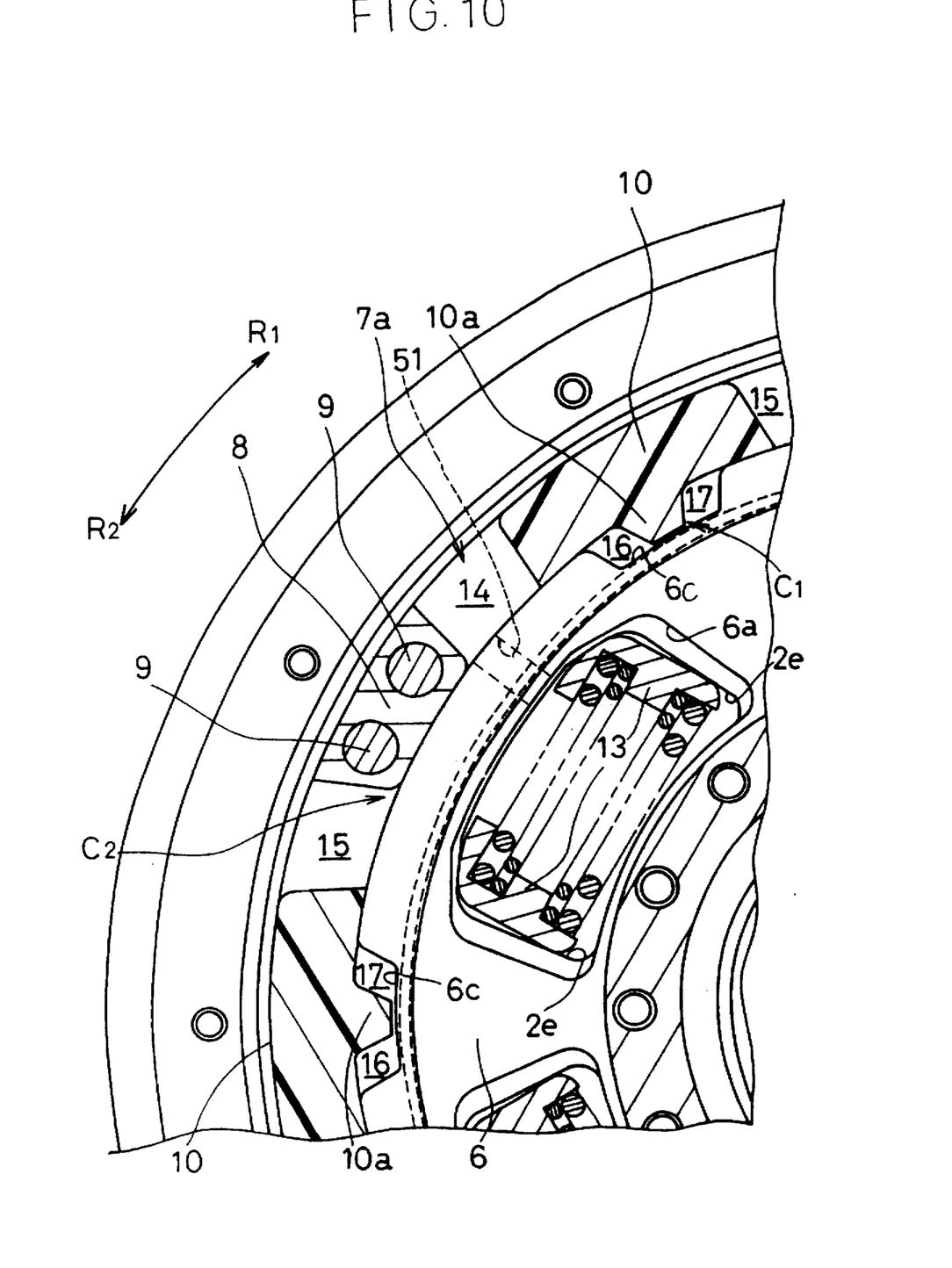
FIG. 10 is view similar to FIG. 4 showing another embodiment of the present invention.

In another embodiment of the present invention, the position of the liquid supplying hole is changed, as shown in FIG. 10, thereby it is possible to adjust torsional characteristics. If a fluid supplying hole 51 is shifted in the direction of rotation $R_2$, as shown in FIG. 10, the fluid supplying hole 51 openly communicates with the first arcuate chamber 14 at the time point where a slide stopper 10 abuts against a driven member 6 (a state shown in FIG. 6 in the above described embodiment). Consequently, a choke $C_2$ does not function until the fluid supplying hole 51 is filled with a stopper member 8. The position and the size of a fluid supplying hole and the number of fluid supplying holes are thus changed, thereby to make it possible to adjust the torsional characteristics.

Figure 11:
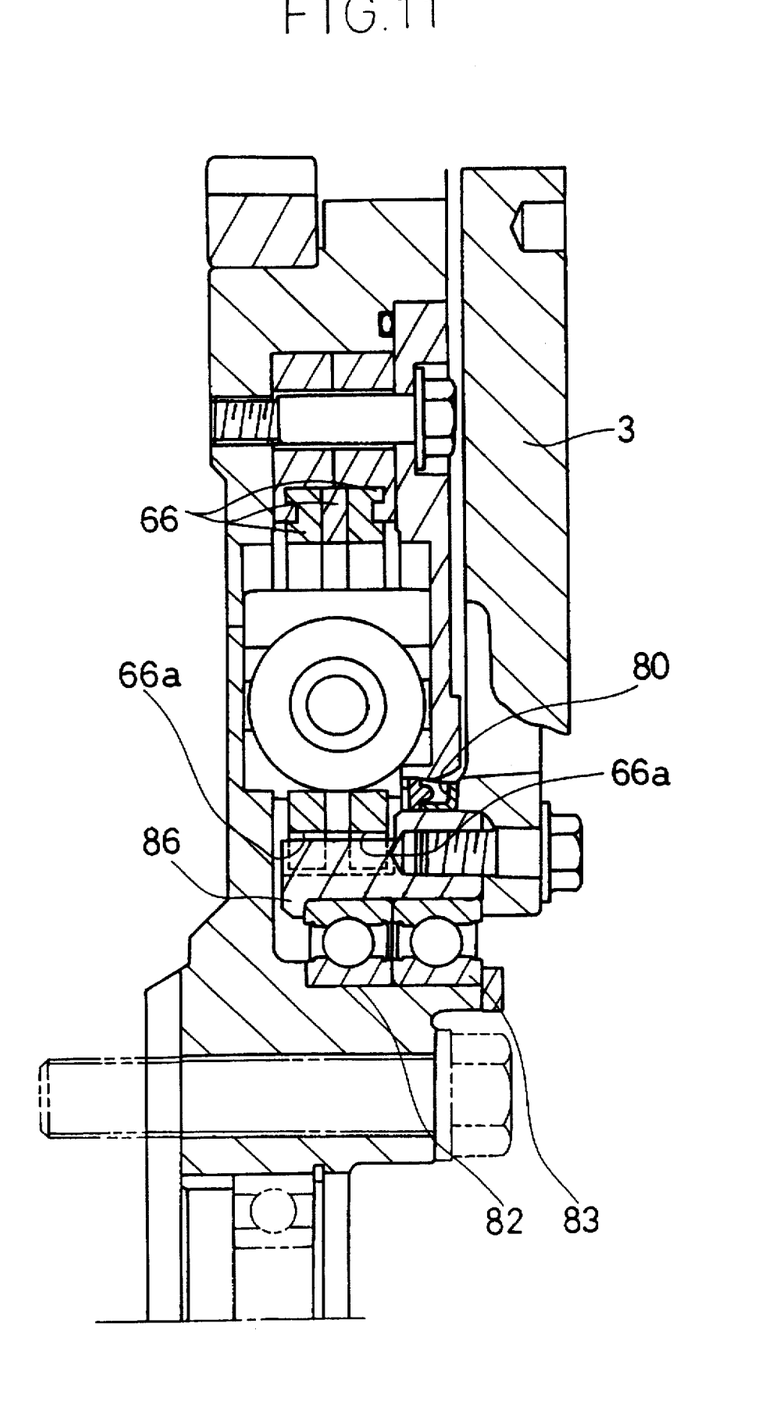
FIG. 11 is a view similar to FIG. 2 showing still yet another embodiment of the present invention.

In still another embodiment, an example in which a driven member and a driven boss are separately provided is shown in FIG. 11. In this case, the driven member in the above described embodiment is constituted by three driven plates 66. Wave-shaped inner teeth 66a are formed in a radially inner portion of the driven plate 66, and wave-shaped outer teeth which are engaged with the wave-shaped inner teeth 66a are formed in a radially outer portion of a driven boss 86. The driven plate 66 and the driven boss 86 are thus separated from each other by a serration, whereby the deflection of a second flywheel 3 does not easily affect the driven plate 66. As with the first embodiment, the present embodiment allows for easy removal of the second flywheel 3, improving duration in which the rolling bearings 82 and 83 are usable. The embodiment depicted in FIG. 11 also includes a seal member 80, which is similar to the seal 20 depicted in FIG. 2.

Various details of the invention may be changed without departing from its spirit nor its scope. Furthermore, the foregoing description of the embodiment according to the present invention is provided for the purpose of illustration only, and not for the purpose of limiting of the invention as defined by the appended claims and their equivalents.

What is claimed is:

1. A flywheel assembly and torsional vibration damping device comprising:

a first flywheel coupleable to an output shaft of a rotary power source;

an input member connected to said first flywheel forming a viscous fluid filled annular fluid chamber therebetween:

an output member coupled to said first flywheel for limited rotary displacement therebetween, through which power is transmittable, said output member having an outer circumferential surface with a cam first surface formed thereon exposed to said fluid chamber;

a viscous damper mechanism disposed in said fluid chamber having means for generating at least two differing levels of viscous damping force in response to relative rotational displacement between said first flywheel and said output member, including a plurality of discrete slider parts each having a radially inwardly extending protrusion formed thereon, a cam second surface formed on said protrusion, each of said slider parts and said output member defining at least two arcuate chambers and a choke disposed between said arcuate chambers for restricting fluid flow therebetween, said second cam surface being engageable with said first cam surface in response to relative rotation of said first flywheel and said output member, said slider part contacting a surface of said first flywheel thus producing friction for damping torsional vibration in response to engagement between said first cam surface and said cam surface and centrifugal forces; and a second flywheel bolted to said output member.

2. The flywheel assembly and torsional vibration damping device according to claim 1, wherein said output member further comprises two splined disc plates and an unsplined disc plate disposed between said two splined disc plates.

3. The flywheel assembly and torsional vibration damping device as set forth in claim 1, further comprising:

a bearing having an inner race with an inner circumferential face, all of said inner circumferential face contacting a portion of said first flywheel and said bearing having an outer race with an outer circumferential face, all of said outer circumferential face contacting a boss formed on said output member.

4. The flywheel assembly and torsional vibration damping device as set forth in claim 3 wherein contact between said second flywheel and said bearing is limited to an axial face of said bearing and an axial surface of said second flywheel, and said second flywheel is supported entirely by said output member.

5. The flywheel assembly and torsional vibration damping device according to claim 1, wherein said output member further comprises two splined disc plates and an unsplined disc plate disposed between said two splined disc plates.

6. A flywheel assembly and torsional vibration damping device comprising:

a first flywheel formed with an axial surface and an inner radial surface adjacent to said axial surface;

a plurality of inwardly extending projections disposed on said inner radial surface of said first flywheel;

an input member rigidly connected to said first flywheel, said first flywheel surfaces and said input member at least partially confining an annular chamber;

an output member at least partially extending into said annular chamber having a circumferential surface with a plurality of recesses generally equally spaced apart from one another along said circumferential surface, each recess having cam surfaces formed therein, said output member and said projections defining a plurality of arcuate chambers within said annular chamber, said circumferential surface and each of said projections further defining a first choke for allowing restricted fluid flow between adjacent arcuate chambers in response to relative displacement of said first flywheel and said output member;

a plurality of discrete arcuate members slidably disposed within each arcuate chamber, each of said arcuate members formed with an inwardly extending projection disposed in said recess between said cam surfaces, each of said arcuate member projections and each of said corresponding recesses defining two sub-chambers and a choke therebetween for limiting fluid flow between said sub-chambers in response to limited rotary displacement of said first flywheel and said output member, said projections engageable with said cam surfaces in response to relative movement of said first flywheel and said output member, said arcuate member engageable with at least one of said first flywheel surfaces for producing dry friction in response to engagement of said projections with said cam surfaces and centrifugal forces; and a second flywheel bolted to said output member.

7. The flywheel assembly and torsional vibration damping device as set forth in claim 6, further comprising:

a bearing having an inner race with an inner circumferential face, all of said inner circumferential face contacting a portion of said first flywheel and said bearing having an outer race with an outer circumferential face, all of said outer circumferential face contacting a boss formed on said output member.

8. The flywheel assembly and torsional vibration damping device as set forth in claim 7, wherein contact between said second flywheel and said bearing is limited to an axial face of said bearing and an axial surface of said second flywheel, and said second flywheel is supported entirely by said output member.

9. A flywheel assembly and torsional vibration damping device comprising:

a first flywheel connectable to an output shaft of a rotary power source;

an input member rigidly connected to said first flywheel, said first flywheel and said input member at least partially defining an annular chamber having a plurality of arcuate chambers therein, at least a first and a second of said arcuate chambers in fluid communication with each other;

an output member disposed in said annular chamber coupled to said input member for limited rotary displacement, said output member having a circumferential surface formed with a plurality of first cam surfaces thereon;

a stopper member fixed to said first flywheel said stopper member and said circumferential surface of said output member defining a choke within said annular chamber between said first and second arcuate chambers which partially restricts fluid passage therebetween in response to relative rotary displacement between said input member and said output member; and a plurality of discrete slider members, each of said slider members being formed with a radially inwardly extending protrusion, said protrusion having at least one second cam surface formed thereon, each of said slider members disposed within said annular chamber proximate to one of said first cam surfaces, said second cam surface of each of said slider members engageable with a corresponding one of said first cam surfaces in response to relative movement of said first flywheel and said output member, and each of said slider members engageable with said first flywheel for producing friction in response to contact between said first cam surface and said second cam surface, and each of said slider members engageable with said first flywheel for producing friction in response to centrifugal forces.

10. The flywheel assembly and torsional vibration damping device as set forth in claim 9, further comprising:

a bearing having an inner race with an inner circumferential face, all of said inner circumferential face contacting a portion of said first flywheel and said bearing having an outer race with an outer circumferential face, all of said outer circumferential face contacting a boss formed on said output member.

11. The flywheel assembly and torsional vibration damping device as set forth in claim 9 wherein contact between said second flywheel and said bearing is limited to an axial face of said bearing and an axial surface of said second flywheel, and said second flywheel is supported entirely by said output member.

* * * * *